United States Patent
Wang et al.

(10) Patent No.: US 11,024,873 B2
(45) Date of Patent: Jun. 1, 2021

(54) LITHIUM-ION BATTERY CONDUCTIVE BONDING AGENT AND PRODUCTION METHOD THEREOF, LITHIUM-ION BATTERY ELECTRODE PLATE AND PRODUCTION METHOD THEREOF, AND LITHIUM-ION BATTERY

(71) Applicant: Huawei Technologies Co., Ltd., Shenzhen (CN)

(72) Inventors: Zhiyong Wang, Shenzhen (CN); Shengan Xia, Shenzhen (CN); Pinghua Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 143 days.

(21) Appl. No.: 16/189,432

(22) Filed: Nov. 13, 2018

(65) Prior Publication Data
US 2019/0081350 A1 Mar. 14, 2019

Related U.S. Application Data

(63) Continuation of application No. PCT/CN2016/108780, filed on Dec. 7, 2016.

(30) Foreign Application Priority Data

May 12, 2016 (CN) .......................... 201610318938.7

(51) Int. Cl.
*H01M 10/0525* (2010.01)
*H01M 4/62* (2006.01)
*H01M 4/13* (2010.01)
*H01M 4/139* (2010.01)

(52) U.S. Cl.
CPC ......... *H01M 10/0525* (2013.01); *H01M 4/13* (2013.01); *H01M 4/139* (2013.01); *H01M 4/62* (2013.01); *H01M 4/621* (2013.01); *H01M 4/624* (2013.01); *Y02T 10/70* (2013.01)

(58) Field of Classification Search
None
See application file for complete search history.

(56) References Cited

U.S. PATENT DOCUMENTS

| 9,190,667 B2 | 11/2015 | Zhamu et al. |
| 2014/0087250 A1 | 3/2014 | Coowar et al. |
| 2016/0308213 A1 | 10/2016 | Wang |

FOREIGN PATENT DOCUMENTS

| CN | 102983012 A | 3/2013 |
| CN | 103165898 A | 6/2013 |
| CN | 103199257 A | 7/2013 |
| CN | 104356979 A | 2/2015 |
| CN | 104752727 A | 7/2015 |
| CN | 105489898 A | 4/2016 |
| CN | 105504169 A | 4/2016 |
| CN | 105576248 A | 5/2016 |
| CN | 105925211 A | 9/2016 |
| WO | 2015073674 A1 | 5/2015 |
| WO | 2015101010 A1 | 7/2015 |
| WO | 2016005590 A1 | 1/2016 |

OTHER PUBLICATIONS

Machine Translation and Abstract of Chinese Publication No. CN105925211, Sep. 7, 2016, 8 pages.
Foreign Communication From A Counterpart Application, Chinese Application No. 201610318938.7, Chinese Office Action dated Jun. 3, 2019, 10 pages.
CPS Instruments Europe, "Comparison of Particle Sizing Methods," Jan. 1, 2019, XP055615022, 14 pages.
"Particle Size Measurement, Short Tutorial," Aug. 23, 2019, XP055615029, 8 pages.
Machine Translation and Abstract of Chinese Publication No. CN102983012, Mar. 20, 2013, 10 pages.
Machine Translation and Abstract of Chinese Publication No. CN103165898, Jun. 19, 2013, 13 pages.
Machine Translation and Abstract of Chinese Publication No. CN104356979, Feb. 18, 2015, 16 pages.
Machine Translation and Abstract of Chinese Publication No. CN105504169, Apr. 20, 2016, 13 pages.
Machine Translation and Abstract of Chinese Publication No. CN105576248, May 11, 2016, 13 pages.

(Continued)

*Primary Examiner* — Sarah A. Slifka
(74) *Attorney, Agent, or Firm* — Conley Rose, P.C.

(57) ABSTRACT

A lithium-ion battery conductive bonding agent, including graphene and a first bonding agent grafted on a surface of the graphene, a production method for the conductive bonding agent, and an electrode plate and a lithium-ion battery that contain the conductive bonding agent, where the first bonding agent includes at least one of polyvinyl alcohol, sodium carboxymethyl cellulose, polyethylene glycol, polylactic acid, polymethyl methacrylate, polystyrene, polyvinylidene fluoride, a hexafluoropropylene polymer, styrene-butadiene rubber, sodium alginate, starch, cyclodextrin, or polysaccharide. The lithium-ion battery conductive bonding agent has good conductive performance and bonding performance and specific strength, improving mechanical strength of a whole electrode plate. The conductive bonding agent integrates a bonding agent and a conductive agent. This can improve content of active substance in the electrode plate, and further increase an energy density of an electrochemical cell.

20 Claims, 2 Drawing Sheets

(56) References Cited

OTHER PUBLICATIONS

Foreign Communication From A Counterpart Application, PCT Application No. PCT/CN2016/108780, English Translation of International Search Report dated Mar. 17, 2017, 2 pages.
Foreign Communication From A Counterpart Application, PCT Application No. PCT/CN2016/108780, English Translation of Written Opinion dated Mar. 17, 2017, 6 pages.
Layek, R., et al., "A review on synthesis and properties of polymer functionalized graphene," XP055546527, Polymer, vol. 54, No. 19, Aug. 1, 2013, pp. 5087-5103.
Zeng, W., et al., "Surface Functionalization of Graphene with Polymers for Enhanced Properties" In: "New Progress on Graphene Research," XP055546552, InTech, Mar. 27, 2013, 28 pages.
Foreign Communication From A Counterpart Application, European Application No. 16901526.0, Extended European Search Report dated Feb. 13, 2019, 7 pages.

LITHIUM-ION BATTERY CONDUCTIVE BONDING AGENT AND PRODUCTION METHOD THEREOF, LITHIUM-ION BATTERY ELECTRODE PLATE AND PRODUCTION METHOD THEREOF, AND LITHIUM-ION BATTERY

CROSS-REFERENCE TO RELATED APPLICATIONS

This application is a continuation of International Patent Application No. PCT/CN2016/108780 filed on Dec. 7, 2016, which claims priority to Chinese Patent Application No. 201610318938.7 filed on May 12, 2016. The disclosures of the aforementioned applications are hereby incorporated by reference in their entireties.

TECHNICAL FIELD

The present application relates to the field of lithium-ion batteries, and in particular, to a lithium-ion battery conductive bonding agent and a production method thereof, a lithium-ion battery electrode plate and a production method thereof, and a lithium-ion battery.

BACKGROUND

Currently, a lithium-ion battery is widely applied in fields such as a portable electronic device, an electric vehicle, and an energy storage electric appliance because of advantages such as a relatively high energy density, a long cycle life, and maintenance-free.

In an existing lithium-ion battery production process, active substance (a positive electrode or negative electrode active material) powder, a conductive agent, and a bonding agent are dispersed in a solvent to form a slurry, a current collector (for example, copper foil or aluminum foil) is coated with the slurry to form an electrode plate, and finally a complete electrochemical cell is assembled. However, an existing commercial conductive agent exists mostly in a form of micrometer particles or even nanometer particles, and is not easy to disperse in a process of slurry stirring. Therefore, in practice, it is usually necessary to add an excessive amount of the conductive agent. This not only reduces an energy density of the electrochemical cell but also significantly reduces initial efficiency of the electrochemical cell. In order to disperse the conductive agent in the solvent as much as possible, it is necessary to add a sufficient amount of the bonding agent or a dispersant to the slurry. However, this reduces conductivity of the electrode plate produced using the slurry and increases internal resistance of the electrochemical cell.

In addition, as power consumption of the portable electronic device such as a mobile phone has been increasing year by year, a market demand for a high-energy-density lithium-ion battery is becoming increasingly urgent. One of technical solutions for significantly increasing the energy density of the lithium-ion battery is to replace existing negative electrode material graphite with an alloy material such as silicon. However, a silicon material undergoes significant volume expansion (>300%) during cycling. As a result, a silicon particle is pulverized and falls off from the current collector, and cycling performance of the electrochemical cell decays rapidly. In an existing industry solution, a macromolecular compound with carboxyl, hydroxyl, or the like that can bond with a silicon-oxygen bond on a silicon surface is used as a bonding agent to coat a surface of the silicon particle in order to constrain pulverization or cracking of a single silicon particle. However, the existing solution only improves a conventional bonding agent, and still requires the conductive agent such as carbon black. In addition, due to a relatively small size (on a nanometer scale), a molecule of the bonding agent lacks rigid support on a micrometer scale. Therefore, under enormous stress caused by the volume expansion of the silicon particle, the molecule of the bonding agent on the nanometer scale cannot constrain overall pulverization or cracking of the silicon particle on the micrometer scale. As a result, the bonding agent loses a bonding effect after a silicon negative electrode is pulverized, and finally, the cycling performance of the electrochemical cell decays rapidly.

SUMMARY

In view of this, a first aspect of the present application provides a conductive bonding agent for a lithium-ion battery. The conductive bonding agent has good conductive performance and bonding performance and has specific strength in order to resolve the following problems because an existing lithium-ion battery needs to use both a conductive agent and a bonding agent, internal resistance of an electrochemical cell increases and an energy density and initial efficiency of the electrochemical cell decrease, and because a molecule of an existing bonding agent cannot constrain overall pulverization or cracking of a silicon particle on a micrometer scale, a bonding agent fails after an silicon negative electrode is pulverized, and cycling performance of an electrochemical cell rapidly decays finally.

According to the first aspect, the present application provides the lithium-ion battery conductive bonding agent, including graphene and a first bonding agent that is grafted on a surface of the graphene, where the first bonding agent includes at least one of polyvinyl alcohol (also referred to as PVA), sodium carboxymethyl cellulose (also referred to as CMC), polyethylene glycol (also referred to as PEG), polylactic acid (also referred to as PLA), polymethyl methacrylate (also referred to as PMMA), polystyrene (also referred to as PS), polyvinylidene fluoride (also referred to as PVdF), a hexafluoropropylene polymer, styrene-butadiene rubber (also referred to as SBR), sodium alginate, starch, cyclodextrin, or polysaccharide.

In the first aspect of the present application, when the first bonding agent is at least one of polyvinyl alcohol, sodium carboxymethyl cellulose, polyethylene glycol, sodium alginate, starch, cyclodextrin, or polysaccharide, the lithium-ion battery conductive bonding agent further includes a second bonding agent that is grafted on the surface of the graphene, where the second bonding agent is connected to the first bonding agent using a chemical bond, and the second bonding agent is at least one of polyacrylic acid (also referred to as PAA) or polyimide (also referred to as PI).

In the first aspect of the present application, both carboxyl in the first bonding agent and carboxyl in the second bonding agent are alkali metal carboxyl.

In the first aspect of the present application, a particle of the graphene has a thickness of 0.35 nanometers (nm) to 50 nm, and a D50 particle size ranges from 50 nm to 5000 nm.

In the first aspect of the present application, the graphene accounts for 0.1%-10% of total mass of the lithium-ion battery conductive bonding agent.

In the first aspect of the present application, the first bonding agent accounts for 20%-50% of total mass of the first bonding agent and the second bonding agent.

The lithium-ion battery conductive bonding agent provided in the first aspect of the present application has good conductive performance and bonding performance and specific strength. Therefore, the conductive bonding agent can not only improve conductivity of an electrode plate but also implement better bonding with active substance (for example, lithium cobalt oxide, graphite, or silicon) at a low additive amount. This can greatly reduce the internal resistance of the electrochemical cell, and can effectively inhibit pulverization of the active substance. In addition, the conductive bonding agent integrates the bonding agent and the conductive agent. This can improve content of the active substance in the electrode plate, and further increase the energy density of the electrochemical cell.

According to a second aspect, the present application provides a production method for the foregoing lithium-ion battery conductive bonding agent, including the following steps of performing oxidation treatment for graphene to obtain oxidized graphene, and either adding a first bonding agent, and performing a condensation reaction to enable the first bonding agent to be grafted on a surface of the oxidized graphene, or adding monomers of a first bonding agent, and performing an atom transfer radical polymerization to enable the monomers of the first bonding agent to be grafted on a surface of the oxidized graphene through polymerization to obtain modified graphene with the first bonding agent grafted such that the lithium-ion battery conductive bonding agent is obtained, where the first bonding agent includes at least one of polyvinyl alcohol, sodium carboxymethyl cellulose, polyethylene glycol, polylactic acid, polymethyl methacrylate, polystyrene, polyvinylidene fluoride, a hexafluoropropylene polymer, styrene-butadiene rubber, sodium alginate, starch, cyclodextrin, or polysaccharide.

In the second aspect of the present application, when the first bonding agent is at least one of polyvinyl alcohol, sodium carboxymethyl cellulose, polyethylene glycol, sodium alginate, starch, cyclodextrin, or polysaccharide, after obtaining the modified graphene with the first bonding agent grafted, the production method further includes adding monomers of a second bonding agent, and applying an initiator to enable the monomers of the second bonding agent to be grafted, through in-situ polymerization, on the surface of the modified graphene with the first bonding agent grafted such that the second bonding agent is connected to the first bonding agent using a chemical bond, and the lithium-ion battery conductive bonding agent is obtained, where the second bonding agent is at least one of polyacrylic acid or polyimide.

In the second aspect of the present application, the initiator is selected from at least one of ammonium persulfate, persulfate alkali metal salt, azodiisobutyronitrile (also referred to as AIBN), benzoyl peroxide (also referred to as BPO), 2,2'-Azobis(2-methylpropionamidine) dihydrochloride (also referred to as AIBA), 4,4'-Azobis(4-cyanopentanoic acid) (also referred to as ACVA), or 2,2'-Azobis[2-(2-imidazolin-2-yl)propane] (also referred to as AIP).

In the second aspect of the present application, when the first bonding agent includes polylactic acid, or when the second bonding agent includes polyacrylic acid, the production method further includes performing alkali metallization on carboxyl in polylactic acid or in polyacrylic acid using an aqueous solution of alkali metal hydroxide.

The production method for the lithium-ion battery conductive bonding agent provided in the second aspect of the present application has a simple and feasible process and is cost-effective.

According to a third aspect, the present application provides a lithium-ion battery electrode plate, including a current collector, and an electrode active material and the lithium-ion battery conductive bonding agent according to the first aspect of the present application that are coated on the current collector. In the lithium-ion battery electrode plate, the lithium-ion battery conductive bonding agent accounts for 0.5%-10% of total mass of the electrode active material and the lithium-ion battery conductive bonding agent.

The lithium-ion battery electrode plate provided in the third aspect of the present application has good conductivity, relatively strong mechanical properties, relatively high active substance content, and strong bonding power on a surface of the current collector.

According to a fourth aspect, the present application provides a production method for a lithium-ion battery electrode plate, including the following steps of preparing a current collector, adding an electrode active material and the lithium-ion battery conductive bonding agent according to the first aspect of the present application to a solvent, mixing the electrode active material and the lithium-ion battery conductive bonding agent with the solvent uniformly to obtain a slurry, coating the current collector with the slurry, drying the current collector at 90 degrees Celsius (° C.)-120° C., and performing pressing to obtain the lithium-ion battery electrode plate.

According to a fifth aspect, the present application provides a lithium-ion battery that contains the lithium-ion battery conductive bonding agent according to the first aspect of the present application. The lithium-ion battery has a relatively high energy density and good cycling performance.

Advantages of the present application are expounded in the following specification. Some of the advantages are obvious according to the specification, or may be learned according to implementation of embodiments of the present application.

DESCRIPTION OF EMBODIMENTS

The following descriptions are preferred implementations of the embodiments of the present application. It should be noted that a person of ordinary skill in the art may make several improvements and polishing without departing from the principles of the embodiments of the present application and the improvements and polishing shall fall within the protection scope of the present application.

In a lithium-ion battery production process, in order to obtain a good-performance electrode plate, it is usually necessary to add both a bonding agent and a conductive agent when producing a slurry. However, addition of these components results in increased internal resistance, a reduced energy density, and reduced initial efficiency of an electrochemical cell. In addition, for an existing battery with a silicon or tin alloy as a negative electrode, in a cycling process, the silicon or tin alloy severely expands and is pulverized. As a result, cycling performance of the electrochemical cell decays severely. To resolve this problem, the industry attempts to constrain pulverization or cracking of a single silicon particle by coating a surface of a silicon particle using a macromolecular compound with carboxyl, hydroxyl, or the like that can bond with a silicon oxygen bond on a silicon surface as a bonding agent. However, an effect is not quite satisfactory because a molecule of a bonding agent of this type is of a relatively small size (on a nanometer scale), and can only constrain the surface of the silicon particle from pulverization within a microscopic range, but has no obvious effect on constraining pulverization inside the silicon particle on a micrometer scale or constraining one silicon particle from falling off from another within a macroscopic range. Therefore, the bonding agent of this type cannot satisfactorily inhibit the expansion and pulverization of the silicon or tin alloy. To resolve the foregoing problems together, the embodiments of the present application provide a lithium-ion battery conductive bonding agent that has good conductive performance and bonding performance and specific strength.

Figure 1:
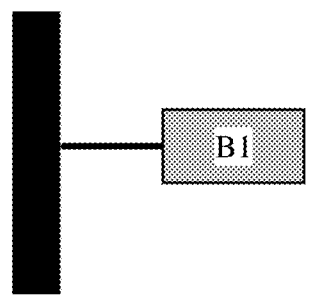
FIG. 1 is a schematic structural diagram of a lithium-ion battery conductive bonding agent in an implementation of the present application.

Further, an embodiment of the present application provides a lithium-ion battery conductive bonding agent, including graphene and a first bonding agent that is grafted on a surface of the graphene. The first bonding agent includes at least one of polyvinyl alcohol (PVA), sodium carboxymethyl cellulose (CMC), polyethylene glycol (PEG), polylactic acid (PLA), polymethyl methacrylate (PMMA), polystyrene (PS), polyvinylidene fluoride (PVdF), a hexafluoropropylene polymer, styrene-butadiene rubber (SBR), sodium alginate, starch, cyclodextrin, or polysaccharide. The hexafluoropropylene polymer includes polyvinylidene fluoride-hexafluoropropylene, a hexafluoropropylene dimer, and a hexafluoropropylene multimer. FIG. 1 is a schematic structural diagram of a lithium-ion battery conductive bonding agent in this implementation. As shown in FIG. 1, a black part on the left is a graphene matrix, and B1 is a macromolecular chain segment of the first bonding agent.

In the lithium-ion battery conductive bonding agent provided in this embodiment of the present application, a graphene skeleton is used, improving conductivity of the electrode plate and enhancing mechanical strength of the whole electrode plate. In addition, the macromolecular bonding agent is grafted on the surface of the graphene, implementing better bonding with active substance (for example, lithium cobalt oxide, graphite, or silicon) at a low additive amount of the conductive bonding agent.

Figure 2:
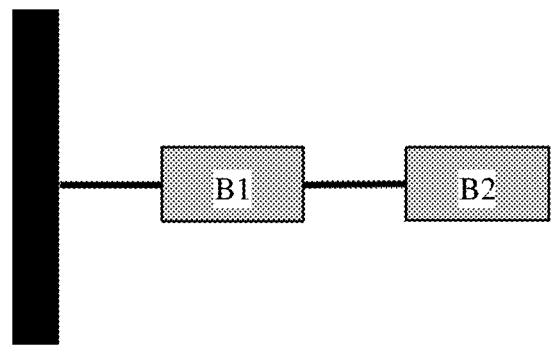
FIG. 2 is a schematic structural diagram of a lithium-ion battery conductive bonding agent according to another implementation of the present application.

In another implementation of the present application, when the first bonding agent is at least one of polyvinyl alcohol, sodium carboxymethyl cellulose, polyethylene glycol, sodium alginate, starch, cyclodextrin, or polysaccharide, the lithium-ion battery conductive bonding agent further includes a second bonding agent that is grafted on the surface of the graphene. The second bonding agent is connected to the first bonding agent using a chemical bond, and the second bonding agent is at least one of polyacrylic acid (PAA) or polyimide (PI). The second bonding agent may further effectively inhibit expansion of an active material such as the silicon particle. FIG. 2 is a schematic structural diagram of a lithium-ion battery conductive bonding agent in this implementation. As shown in FIG. 2, a black part on the left is a graphene matrix, B1 is a macromolecular chain segment of the first bonding agent, and B2 is a macromolecular chain segment of the second bonding agent.

In this implementation of the present application, both carboxyl in the first bonding agent and carboxyl in the second bonding agent are alkali metal carboxyl. After being neutralized to form carboxylate, the carboxyl in the first bonding agent and the carboxyl in the second bonding agent lose acidity, thereby avoiding a reaction with lithium hexafluorophosphate in an electrolyte when being subsequently used in a lithium-ion battery.

In this implementation of the present application, a particle of the graphene has a thickness of 0.35 nm to 50 nm, and a D50 particle size ranges from 50 nm to 5000 nm. In a preferred implementation of the present application, the particle of the graphene has a thickness of 5 nm, and the D50 particle size is 100 nm. Selection of the graphene of an appropriate size not only helps dispersion and provides good conductivity but also enables the conductive bonding agent to obtain specific strength.

In this implementation of the present application, the graphene may be conventional graphene, or may be doped graphene. A doping element in the doped graphene may include at least one of N, B, P, S, F, Cl, or O. The graphene may be single-layer graphene or multilayer graphene.

In this implementation of the present application, the graphene accounts for 0.1%-10%, preferably 0.5%-10%, of total mass of the lithium-ion battery conductive bonding agent.

In this implementation of the present application, when both the first bonding agent and the second bonding agent are grafted on the surface of the graphene, the first bonding agent accounts for 20%-50% of total mass of the first bonding agent and the second bonding agent.

Figure 3:
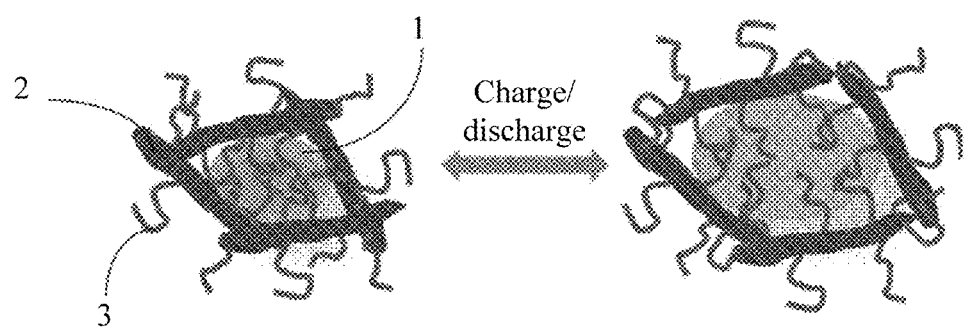
FIG. 3 is a schematic diagram showing an effect of inhibiting pulverization and expansion of a silicon particle by a lithium-ion battery conductive bonding agent according to an embodiment of the present application.

To describe an effect of inhibiting pulverization and expansion of a silicon particle by a lithium-ion battery conductive bonding agent in this embodiment of the present application more clearly, refer to a schematic effect diagram in FIG. 3. In FIG. 3, 1 is a silicon particle, 2 is graphene, and 3 is a molecular chain of a bonding agent grafted on the graphene 2. As shown in FIG. 3, the silicon particle 1 is confined within a hollow structure built by graphene sheets, and hydrogen bonds formed between functional groups such as hydroxyl or carboxyl on macromolecular chains of the bonding agent grafted on surfaces of the graphene sheets form a strong bond between adjacent graphene sheets. In this way, when the silicon particle 1 expands to a large extent, the graphene sheets around the silicon particle 1 do not completely separate from each other. When the silicon particle 1 is intercalated with lithium and expands, the macromolecular chains of the bonding agent 3 stretch to provide stress releasing space for volume expansion. When the silicon particle 1 is delithiated and contracts, the macromolecular chains of the bonding agent 3 contract and twine around the silicon particle 1 again such that the graphene 2 is always in contact with silicon particle 1. In addition, the macromolecular chains of the bonding agent 3 always cover the surface of the silicon particle 1 such that a surface layer of the silicon particle 1 does not fall off from a main body after being pulverized, and finally the silicon particle 1 is effectively inhibited from being pulverized and expanding.

The lithium-ion battery conductive bonding agent provided in the first aspect of the present application has good conductive performance and bonding performance and specific strength. Therefore, the conductive bonding agent can not only improve conductivity of the electrode plate but also implement better bonding with active substance (for example, lithium cobalt oxide, graphite, or silicon) at a low additive amount. This can greatly reduce the internal resistance of the electrochemical cell, and can effectively inhibit pulverization of the electrode active substance. In addition, the conductive bonding agent integrates the bonding agent and the conductive agent. This can improve content of the active substance in the electrode plate, and further increase the energy density of the electrochemical cell.

The lithium-ion battery conductive bonding agent provided in this embodiment of the present application may be used for the negative electrode or a positive electrode of the lithium-ion battery. When the lithium-ion battery conductive bonding agent provided in this embodiment of the present application is applied to a conventional graphite negative or positive electrode, conductive performance of the electrode and bonding performance of a particle can be enhanced, internal resistance of a battery can be reduced, and rate performance and cycling performance of the battery can be improved. When the lithium-ion battery conductive bonding agent provided in this embodiment of the present application is applied to a silicon, tin, or alloy negative electrode, the graphene skeleton in the conductive bonding agent further has a protective effect of constraining the negative electrode from expansion and pulverization by coating a particle and providing rigid support for the bonding agent in order to finally improve cycling stability of the silicon, tin, or alloy negative electrode effectively.

Correspondingly, an embodiment of the present application provides a production method for the foregoing lithium-ion battery conductive bonding agent, including the following steps of performing oxidation treatment for graphene to obtain oxidized graphene, and either adding a first bonding agent, and performing a condensation reaction to enable the first bonding agent to be grafted on a surface of the oxidized graphene, or adding monomers of a first bonding agent, and performing an atom transfer radical polymerization to enable the monomers of the first bonding agent to be grafted on a surface of the oxidized graphene through polymerization to obtain modified graphene with the first bonding agent grafted such that the lithium-ion battery conductive bonding agent is obtained, where the first bonding agent includes at least one of polyvinyl alcohol, sodium carboxymethyl cellulose, polyethylene glycol, polylactic acid, polymethyl methacrylate, polystyrene, polyvinylidene fluoride, a hexafluoropropylene polymer, styrene-butadiene rubber, sodium alginate, starch, cyclodextrin, or polysaccharide.

Further, for a method 1 of adding a first bonding agent, and performing a condensation reaction to enable the first bonding agent to be grafted on a surface of the oxidized graphene, this method is suitable for grafting of polyvinyl alcohol (PVA), sodium carboxymethyl cellulose (CMC), polyethylene glycol (PEG), sodium alginate, starch, cyclodextrin, or polysaccharide.

For a method 2 of adding monomers of a first bonding agent, and performing an atom transfer radical polymerization to enable the monomers of the first bonding agent to be grafted on a surface of the oxidized graphene through polymerization, this method is suitable for grafting of polylactic acid (PLA), polymethyl methacrylate (PMMA), polystyrene (PS), polyvinylidene fluoride (PVdF), a hexafluoropropylene polymer (HFP), or styrene-butadiene rubber (SBR). The monomer of the second bonding agent includes lactic acid, methyl methacrylate, styrene, vinylidene fluoride, hexafluoropropylene, or butadiene.

In this implementation of the present application, a specific reaction condition required by the condensation reaction and the atom transfer radical polymerization, including solvents required by the reaction, a reaction temperature, a reaction time, and the like, may be determined according to a type of a specific to-be-grafted first bonding agent, and is not particularly limited in the present application.

In this implementation of the present application, a specific operation of the oxidation treatment includes heating the graphene in an aqueous solution or atmosphere of a strong oxidant to 50° C.-95° C. to form oxidized graphene. The oxidant is selected from at least one of sulfuric acid, nitric acid, perchloric acid, ammonium persulfate salt, persulfate alkali metal salt, permanganate alkali metal salt, dichromated alkali metal salt, hydrogen peroxide, or ozone. There is a large quantity of carboxyl functional groups on the surface of the oxidized graphene.

In this implementation of the present application, when the first bonding agent is at least one of polyvinyl alcohol, sodium carboxymethyl cellulose, polyethylene glycol, sodium alginate, starch, cyclodextrin, or polysaccharide, after obtaining the modified graphene with the first bonding agent grafted, the production method further includes adding monomers of a second bonding agent, and applying an initiator to enable the monomers of the second bonding agent to be grafted, through in-situ polymerization, on the surface of the modified graphene with the first bonding agent grafted such that the second bonding agent is connected to the first bonding agent using a chemical bond, and the lithium-ion battery conductive bonding agent is obtained. The second bonding agent is at least one of polyacrylic acid or polyimide.

In this implementation of the present application, the initiator is selected from at least one of ammonium persulfate, persulfate alkali metal salt, azodiisobutyronitrile (AIBN), benzoyl peroxide (BPO), 2,2'-Azobis(2-methylpropionamidine) dihydrochloride (AIBA), 4,4'-Azobis(4-cyanopentanoic acid) (ACVA), or 2,2'-Azobis[2-(2-imidazolin-2-yl)propane] (AIP). If the initiator is persulfate, sodium bisulfite needs to be added, and a mass ratio of persulfate to sodium bisulfite is 100:1-1:1.

In this implementation of the present application, when the first bonding agent includes polylactic acid, or when the second bonding agent includes polyacrylic acid, the production method further includes performing alkali metallization on carboxyl in polylactic acid or in polyacrylic acid using an aqueous solution of alkali metal hydroxide. The aqueous solution of alkali metal hydroxide may be lithium hydroxide, sodium hydroxide, or potassium hydroxide. The aqueous solution of alkali metal hydroxide is used to neutralize a system such that pH of the system becomes 6-7 and carboxylate is formed.

The production method for the lithium-ion battery conductive bonding agent provided in this embodiment of the present application has a simple and feasible process and is cost-effective.

In addition, an embodiment of the present application further provides a lithium-ion battery electrode plate, including a current collector, and an electrode active material and the foregoing lithium-ion battery conductive bonding agent according to the embodiment of the present application that are coated on the current collector. In the lithium-ion battery electrode plate, the lithium-ion battery conductive bonding agent accounts for 0.5%-10%, preferably 2%-5%, of total mass of the electrode active material and the lithium-ion battery conductive bonding agent.

The lithium-ion battery electrode plate provided in this embodiment of the present application has good conductivity, relatively strong mechanical properties, relatively high active substance content, and strong bonding power on a surface of the current collector.

Correspondingly, an embodiment of the present application further provides a production method for a lithium-ion battery electrode plate, including the following steps of preparing a current collector, adding an electrode active material and the foregoing lithium-ion battery conductive bonding agent according to the embodiment of the present application to a solvent, mixing the electrode active material and the lithium-ion battery conductive bonding agent with the solvent uniformly to obtain a slurry, coating the current collector with the slurry, drying the current collector at 90° C.-120° C., and performing pressing to obtain the lithium-ion battery electrode plate.

The lithium-ion battery conductive bonding agent accounts for 0.5%-10%, of total mass of the electrode active material and the lithium-ion battery conductive bonding agent. The lithium-ion battery electrode plate may be pressed to a required thickness, which may be 0.05 millimeters (mm)-0.15 mm. The solvent includes water, N-methylpyrrolidone (NMP), and the like.

An embodiment of the present application provides a lithium-ion battery that contains the foregoing lithium-ion battery conductive bonding agent according to the embodiment of the present application. The lithium-ion battery has a relatively high energy density and good cycling performance.

The following uses a plurality of embodiments to further describe the embodiments of the present application. The embodiments of the present application are not limited to the following specific embodiments. An implementation may be adjusted appropriately within the scope of the main claims.

Embodiment 1

A production method for a lithium-ion battery conductive bonding agent includes the following steps.

(1) Weigh out 10 grams (g) of graphene, mix the graphene with 100 g of a concentrated nitric acid (65 wt %) aqueous solution, heat the mixture to 95° C., stir the mixture for 4 hours (h), wash the mixture using water, and dry the mixture to obtain an oxidized graphene sample G.

(2) Add 10 g of the oxidized graphene sample G to 100 milliliters (ml) of dimethyl sulfoxide (DMSO), add 2 g of thionyl chloride, stir the mixture at room temperature for 2 h to facilitate a reaction, wash the mixture using DMSO after the reaction ends, re-disperse the mixture in DMSO, add 2 g of PVA, stir the mixture at 120° C. for 2 h, wash the mixture using water, and dry the mixture, to obtain PVA-grafted modified graphene G-PVA.

(3) Disperse the G-PVA in water, inject nitrogen into the water to remove oxygen, add 2 g of acrylic acid, 0.1 g of $K_2S_2O_8$, and 0.03 g of $NaHSO_3$ while stirring the water, heat the mixture to 55° C., let a reaction last for 2 h-4 h, after the reaction ends, wash the mixture using water, and dry the mixture to obtain polyvinyl alcohol-polyacrylic acid (PVA-PAA)-grafted graphene G-PVA-b-PAA.

(4) Disperse G-PVA-b-PAA in water, add a LiOH aqueous solution to neutralize the mixture to pH-6, wash the mixture using water, and dry the mixture to obtain a final product G-PVA-b-PAALi. That is, a lithium-ion battery conductive bonding agent is obtained.

The product may be used as a conductive agent and a bonding agent in a process of producing a slurry for a negative electrode material of a lithium-ion battery, such as graphite, silicon, or an alloy thereof.

Figure 4:
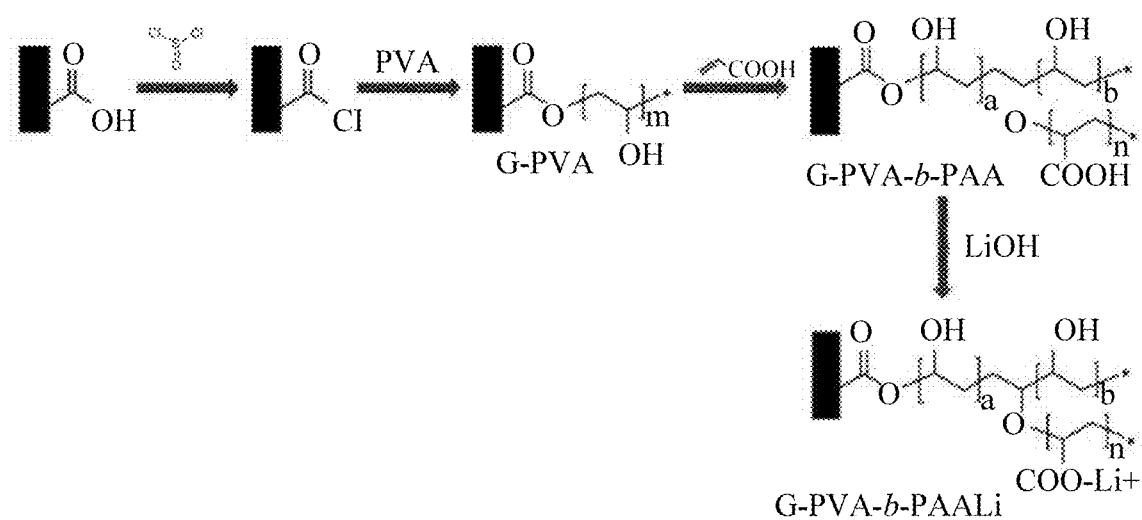
FIG. 4 is a synthesis flowchart of a lithium-ion battery conductive bonding agent according to Embodiment 1 of the present application.

FIG. 4 is a synthesis flowchart of a lithium-ion battery conductive bonding agent according to this embodiment. G-PVA-b-PAALi with a, b, and n being different values may be obtained by changing a material ratio or the like. A value range of a is 50-100000, a value range of b is 50-100000, and a value range of n is 100-200000. In another embodiment the value range of a is 500-20000, the value range of b is 500-20000, and the value range of n is 1000-20000.

The lithium-ion battery is produced as follows. Uniformly mixing a silicon negative electrode material (a particle size of 100 nm) and the lithium-ion battery conductive bonding agent G-PVA-b-PAALi produced in this embodiment according to a mass ratio of 93:7 in water to obtain a negative electrode slurry, coating a copper foil current collector with the obtained negative electrode slurry, drying the current collector at 110° C. in a vacuum state to obtain a negative electrode plate, and performing assembling in a glove box to form a button battery for testing. An electrode is made of lithium metal, celgard C2400 is used as a separator, and a 1.3 M $LiPF_6$ solution of EC, PC, and DEC (a volume ratio of 3:1:6) is used as an electrolyte.

Embodiment 2

A production method for a lithium-ion battery conductive bonding agent includes the following steps.

(1) Weigh out 10 g of graphene, mix the graphene with 100 g of a concentrated nitric acid (65 wt %) aqueous solution, heat the mixture to 95° C., stir the mixture for 4 h, wash the mixture using water, and dry the mixture to obtain an oxidized graphene sample G.

(2) Disperse 10 g of the oxidized graphene in 100 ml of tetrahydrofuran (THF) through stirring, add 1 g of diborane, and stir the mixture at room temperature for 12 h, to reduce carboxyl, anhydride, carbonyl, or the like on a surface of the oxidized graphene to alcoholic hydroxyl, and wash the mixture using THF, dry the mixture, re-disperse the mixture in a mixed solution of 2 g pyridine and 100 mL dry ether, add 2 g of 2-bromoisobutyryl bromide (BiBB), stir the mixture slowly at 0° C. for 2 h, then stir the mixture at room temperature for 10 h to facilitate a reaction, wash the mixture using anhydrous alcohol, and dry the mixture, to obtain hydroxy-brominated oxidized graphene G-Br.

(3) Add 100 ml of methanol, 3 g of vinylidene fluoride, 0.02 g of cuprous bromide (CuBr), and 0.05 g of 2,2'-bipyridine (Bpy) to a reactor, and perform argon bubbling at room temperature for 30 minutes to remove oxygen in a system, and under an argon-protected atmosphere, add powder of G-Br, seal the reactor, stir the mixture at room temperature for 24 h to facilitate a reaction, filter the mixture after the reaction ends, wash the mixture using anhydrous methanol, and dry the mixture, to obtain a polyvinylidene fluoride-grafted modified graphene sample G-PVdF. That is, a lithium-ion battery conductive bonding agent is obtained.

The product may be used as a conductive agent and a bonding agent in a process of producing a slurry for a positive electrode material and a graphite negative electrode material of a lithium-ion battery.

The lithium-ion battery is produced as follows. Uniformly mixing lithium cobalt oxide and powder of the lithium-ion battery conductive bonding agent G-PVdF produced in this embodiment according to a mass ratio of 93:7 in N-methylpyrrolidone (NMP) to obtain a positive electrode slurry, coating an aluminum foil current collector with the obtained positive electrode slurry, drying the current collector at 120°

C. in a vacuum state to obtain a positive electrode plate, and performing assembling in a glove box to form a button battery for testing. An electrode is made of lithium metal, celgard C2400 is used as a separator, and a 1.3 M $LiPF_6$ solution of EC, PC, and DEC (a volume ratio of 3:1:6) is used as an electrolyte.

Embodiment 3

A production method for a lithium-ion battery conductive bonding agent includes the following steps.

(1) Weigh out 10 g of graphene, mix the graphene with 100 g of a concentrated nitric acid (65 wt %) aqueous solution, heat the mixture to 95° C., stir the mixture for 4 h, wash the mixture using water, and dry the mixture to obtain an oxidized graphene sample G.

(2) Add 10 g of the oxidized graphene sample G to 200 ml of dimethyl sulfoxide (DMSO), add 15 g of thionyl chloride, stir the mixture at room temperature for 4 h to facilitate a reaction, after the reaction ends, wash the mixture using DMSO, re-disperse the mixture in DMSO, add 3 g of sodium carboxymethyl cellulose, stir the mixture at 120° C. for 6 h, wash the mixture using water, and dry the mixture, to obtain sodium carboxymethyl cellulose-grafted modified graphene G-CMC.

The product may be used as a conductive agent and a bonding agent in a process of producing a slurry for a negative electrode material of a lithium-ion battery, such as graphite, silicon, or an alloy thereof.

The lithium-ion battery is produced as follows. Uniformly mixing a silicon negative electrode material (a particle size of 100 nm) and the lithium-ion battery conductive bonding agent G-PVA-b-PAALi produced in this embodiment according to a mass ratio of 93:7 in water to obtain a negative electrode slurry, coating a copper foil current collector with the obtained negative electrode slurry, drying the current collector at 110° C. in a vacuum state to obtain a negative electrode plate, and performing assembling in a glove box to form a button battery for testing. An electrode is made of lithium metal, celgard C2400 is used as a separator, and a 1.3 M $LiPF_6$ solution of EC, PC, and DEC (a volume ratio of 3:1:6) is used as an electrolyte.

Embodiment 4

A production method for a lithium-ion battery conductive bonding agent includes the following steps.

(1) Weigh out 10 g of graphene, mix the graphene with 100 g of a concentrated nitric acid (65 wt %) aqueous solution, heat the mixture to 95° C., stir the mixture for 4 h, wash the mixture using water, and dry the mixture to obtain an oxidized graphene sample G.

(2) Disperse 10 g of the oxidized graphene in 100 ml of tetrahydrofuran (THF) through stirring, add 1 g of diborane, and stir the mixture at room temperature for 12 h, to reduce carboxyl, anhydride, carbonyl, or the like on a surface of the oxidized graphene to alcoholic hydroxyl, and wash the mixture using THF, dry the mixture, re-disperse the mixture in a mixed solution of 2 g pyridine and 100 mL dry ether, add 2 g of 2-bromoisobutyryl bromide (BiBB), stir the mixture slowly at 0° C. for 2 h, then stir the mixture at room temperature for 10 h to facilitate a reaction, wash the mixture using anhydrous alcohol, and dry the mixture, to obtain hydroxy-brominated oxidized graphene G-Br.

(3) Add 100 mL of methanol, 4 g of methyl methacrylate, 0.03 g of cuprous bromide (CuBr), and 0.06 g of 2,2'-bipyridine (Bpy) to a reactor, and perform argon bubbling at room temperature for 30 minutes to remove oxygen in a system, and under an argon-protected atmosphere, add powder of G-Br, seal the reactor, stir the mixture at room temperature for 18 h to facilitate a reaction, filter the mixture after the reaction ends, wash the mixture using anhydrous methanol, and dry the mixture to obtain a polymethyl methacrylate-grafted modified graphene sample G-PMMA. That is, a lithium-ion battery conductive bonding agent is obtained.

The product may be used as a conductive agent and a bonding agent in a process of producing a slurry for a negative electrode material of a lithium-ion battery, such as graphite, silicon, or an alloy thereof.

The lithium-ion battery is produced as follows. Uniformly mixing a silicon negative electrode material (a particle size of 100 nm) and the lithium-ion battery conductive bonding agent G-PVA-b-PAALi produced in this embodiment according to a mass ratio of 93:7 in water to obtain a negative electrode slurry, coating a copper foil current collector with the obtained negative electrode slurry, drying the current collector at 110° C. in a vacuum state to obtain a negative electrode plate, and performing assembling in a glove box to form a button battery for testing. An electrode is made of lithium metal, celgard C2400 is used as a separator, and a 1.3 M $LiPF_6$ solution of EC, PC, and DEC (a volume ratio of 3:1:6) is used as an electrolyte.

Effect Embodiment

In order to provide strong support for beneficial effects brought by the technical solutions of the embodiments of the present application, the following performance tests are provided.

An initial charge and discharge efficiency test and a capacity retention rate test are performed as follows.

(1) Charge the button battery in Embodiment 1 to a voltage 0.001 volts (V) with a current of 100 milliamperes (mA) per 1 g active substance, retain the voltage unchanged until the current is less than 10 mA per 1 g active substance, keep the state for 10 minutes, and discharge the foregoing button battery to 2.5 V with the current of 100 mA per 1 g active substance. The foregoing charge and discharge process is recorded as one charge/discharge cycle. Record initial charge and discharge capacities of the battery and charge and discharge capacities obtained after the battery is charged and discharged cyclically for 50 times.

(1) Charge the button battery in Embodiment 2 to a voltage 4.4 V with a current of 100 mA per 1 g active substance, retain the voltage unchanged until the current is less than 10 mA per 1 g active substance, keep the state for 10 minutes, and discharge the foregoing button battery to 3.0 V with the current of 100 mA per 1 g active substance. The foregoing charge and discharge process is recorded as one charge/discharge cycle. Record initial charge and discharge capacities of the battery and charge and discharge capacities obtained after the battery is charged and discharged cyclically for 50 times.

Formulas for calculating initial coulombic efficiency and a capacity retention rate of a battery are as follows.

Initial coulombic efficiency (%)=initial discharge capacity/initial charge capacity×100%.

Capacity retention rate of an $n^{th}$ cycle (%)=discharge capacity of the $n^{th}$ cycle/discharge capacity of a first cycle×100%.

Results of the initial charge and discharge efficiency test and the capacity retention rate test performed on the button battery in Embodiment 1 and the button battery in Embodiment 2 are listed in Table 1.

TABLE 1

|  | First cycle | | Initial | 50th cycle | | | |
| --- | --- | --- | --- | --- | --- | --- | --- |
|  | Discharge capacity (mAh/g) | Charge capacity (mAh/g) | coulombic efficiency (%) | Discharge capacity (mAh/g) | Charge capacity (mAh/g) | Discharge efficiency (%) | Capacity retention rate (%) |
| Button battery in Embodiment 1 | 2610 | 3063 | 85.2% | 2349 | 2422 | 97 | 90 |
| Button battery in Embodiment 2 | 165.0 | 173.7 | 95.0% | 151.8 | 154.9 | 98 | 92 |

It can be learned from the above that the lithium-ion battery conductive bonding agent produced in the embodiments of the present application can effectively alleviate negative impact brought by a volume change of the active material in the charge and discharge process, and improve a cycling characteristic of the battery. In addition, the lithium-ion battery conductive bonding agent is used as both the conductive agent and the bonding agent. This can improve content of lithium-intercalated active substance of the positive and negative electrodes, and increase the energy density of the electrochemical cell.

What is claimed is:

1. A lithium-ion battery conductive bonding agent, comprising:
   graphene;
   a first bonding agent grafted on a surface of the graphene, wherein the first bonding agent comprises at least one of polyvinyl alcohol, sodium carboxymethyl cellulose, polyethylene glycol, sodium alginate, starch, cyclodextrin, or polysaccharide; and
   a second bonding agent grafted on the surface of the graphene and coupled to the first bonding agent using a chemical bond, wherein the second bonding agent comprises polyimide.

2. The lithium-ion battery conductive bonding agent of claim 1, wherein both carboxyl in the first bonding agent and carboxyl in the second bonding agent are alkali metal carboxyl.

3. The lithium-ion battery conductive bonding agent of claim 1, wherein a particle of the graphene has a thickness of 0.35 nanometers (nm) to 50 nm, and a D50 particle size ranging from 50 nm to 5000 nm.

4. The lithium-ion battery conductive bonding agent of claim 1, wherein the graphene comprises 0.1% to 10% of total mass of the lithium-ion battery conductive bonding agent.

5. The lithium-ion battery conductive bonding agent of claim 1, wherein the first bonding agent comprises 20% to 50% of total mass of the first bonding agent and the second bonding agent.

6. A lithium-ion battery electrode plate, comprising:
   a current collector; and
   an electrode active material and a lithium-ion battery conductive bonding agent coated on the current collector, wherein the lithium-ion battery conductive bonding agent comprises:
   graphene;
   a first bonding agent grafted on a surface of the graphene and comprising at least one of polyvinyl alcohol, sodium carboxymethyl cellulose, polyethylene glycol, sodium alginate, starch, cyclodextrin, or polysaccharide; and
   a second bonding agent grafted on the surface of the graphene and coupled to the first bonding agent using a chemical bond, wherein the second bonding agent comprises polyimide.

7. The lithium-ion battery electrode plate of claim 6, wherein the lithium-ion battery conductive bonding agent comprises 0.5% to 10% of total mass of the electrode active material and the lithium-ion battery conductive bonding agent.

8. The lithium-ion battery electrode plate of claim 6, wherein carboxyl in the first bonding agent and carboxyl in the second bonding agent are alkali metal carboxyl.

9. The lithium-ion battery electrode plate of claim 6, wherein a particle of the graphene has a thickness of 0.35 nanometers (nm) to 50 nm, and a D50 particle size ranging from 50 nm to 5000 nm.

10. The lithium-ion battery electrode plate of claim 9, wherein the particle of the graphene has a thickness of 5 nm and the D50 particle size is 100 nm.

11. The lithium-ion battery electrode plate of claim 6, wherein the graphene comprises a single-layer graphene or a multi-layer graphene.

12. The lithium-ion battery electrode plate of claim 6, wherein the graphene comprises 0.1% to 10% of total mass of the lithium-ion battery conductive bonding agent.

13. The lithium-ion battery electrode plate of claim 6, wherein the first bonding agent comprises 20% to 50% of total mass of the first bonding agent and the second bonding agent.

14. A lithium-ion battery, comprising a lithium-ion battery conductive bonding agent, wherein the lithium-ion battery conductive bonding agent comprises:
   graphene;
   a first bonding agent grafted on a surface of the graphene and comprising at least one of polyvinyl alcohol, sodium carboxymethyl cellulose, polyethylene glycol, polylactic acid, polymethyl methacrylate, polystyrene, polyvinylidene fluoride, a hexafluoropropylene polymer, styrene-butadiene rubber, sodium alginate, starch, cyclodextrin, or polysaccharide; and
   a second bonding agent grafted on the surface of the graphene when the first bonding agent is at least one of the polyvinyl alcohol, the sodium carboxymethyl cellulose, the polyethylene glycol, the sodium alginate, the starch, the cyclodextrin, or the polysaccharide, wherein the second bonding agent is coupled to the first bonding agent using a chemical bond, and wherein the second bonding agent is at least one of polyacrylic acid or polyimide.

15. The lithium-ion battery of claim 14, wherein carboxyl in the first bonding agent and carboxyl in the second bonding agent are alkali metal carboxyl.

16. The lithium-ion battery of claim 14, wherein a particle of the graphene has a thickness of 0.35 nanometers (nm) to 50 nm, and a D50 particle size ranging from 50 nm to 5000 nm.

17. The lithium-ion battery of claim 16, wherein the particle of the graphene has a thickness of 5 nm and the D50 particle size is 100 nm.

18. The lithium-ion battery of claim 14, wherein the graphene comprises 0.1% to 10% of total mass of the lithium-ion battery conductive bonding agent.

19. The lithium-ion battery of claim 14, wherein the graphene comprises a single-layer graphene or a multi-layer graphene.

20. A production method for a lithium-ion battery electrode plate, comprising:

preparing a current collector;
adding an electrode active material and a lithium-ion battery conductive bonding agent to a solvent, wherein the lithium-ion battery conductive bonding agent comprises graphene, a first bonding agent grafted on a surface of the graphene, and a second bonding agent grafted on the surface of the graphene and coupled to the first bonding agent using a chemical bond, wherein the first bonding agent comprises at least one of polyvinyl alcohol, sodium carboxymethyl cellulose, polyethylene glycol, polylactic acid, polymethyl methacrylate, polystyrene, polyvinylidene fluoride, a hexafluoropropylene polymer, styrene butadiene rubber, sodium alginate, starch, cyclodextrin, or polysaccharide, and wherein the second bonding agent comprises polyimide;
mixing the electrode active material and the lithium-ion battery conductive bonding agent with the solvent uniformly to obtain a slurry;
coating the current collector with the slurry;
drying the current collector; and
pressing to obtain the lithium-ion battery electrode plate.

* * * * *

UNITED STATES PATENT AND TRADEMARK OFFICE
CERTIFICATE OF CORRECTION

PATENT NO.         : 11,024,873 B2                               Page 1 of 1
APPLICATION NO.    : 16/189432
DATED              : June 1, 2021
INVENTOR(S)        : Wang et al.

It is certified that error appears in the above-identified patent and that said Letters Patent is hereby corrected as shown below:

In the Claims

Claim 20, Column 16, Lines 11-14: "glycol, polylactic acid, polymethyl methacrylate, polystyrene, polyvinylidene fluoride, a hexafluoropropylene polymer, styrene butadiene rubber, sodium alginate," should read "glycol, sodium alginate,"

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*